Dec. 12, 1944.  W. J. MATTOX ET AL  2,364,739
TREATMENT OF HYDROCARBONS
Filed June 16, 1941

Inventors:
William J. Mattox
Wayne L. Benedict
By Lee J. Gary
Attorney

Patented Dec. 12, 1944

2,364,739

UNITED STATES PATENT OFFICE 2,364,739

TREATMENT OF HYDROCARBONS

William J. Mattox and Wayne L. Benedict, Chicago, Ill., assignors to Universal Oil Products Company, Chicago, Ill., a corporation of Delaware Application June 16, 1941, Serial No. 398,183

5 Claims. (Cl. 196—52)

This invention relates to a process for converting hydrocarbons into more valuable products by catalytic treatment. More particularly, it relates to relatively high temperature conversion processes wherein the catalytic materials become coated with carbonaceous or hydrocarbonaceous deposits and must be subjected to periodic treatment with an oxygen-containing gas to restore the catalytic activity.

The invention is particularly applicable to catalytic reforming of naphthas to improve the antiknock properties thereof; catalytic cyclization of straight chain hydrocarbons containing 6 to 12 carbon atoms in straight chain arrangement, and to the catalytic dehydrogenation of hydrocarbons to produce hydrocarbons containing smaller amounts of hydrogen per molecule than the original charging stock.

In one specific embodiment the present invention comprises an improvement in processes for catalytically converting hydrocarbons into more valuable products wherein the catalyst becomes contaminated with a deposit of carbonaceous material, said improvement comprising contacting said hydrocarbons with said catalyst in a plurality of catalytic reactors, at least four in number, serially arranged, the final pair of said reactors being arranged so that they may be alternately reactivated and so that one of these reactors is continuously in series with the other reactors in the system during processing; further providing that the catalytic material in the first of said catalytic reactors shall be replaced by fresh catalyst when the overall conversion of the process has dropped to a predetermined point and shall then take the place of the reactors formerly last in line, the latter being moved up one step in line thereby forming a continuous cyclic operation in which only the final pair of catalytic reactors containing the most active catalyst is subjected to periodic reactivation. Of course during shut down periods the catalyst in the other chambers may be reactivated, but this is required at much less frequent intervals.

In a further embodiment the invention comprises utilizing an apparatus for catalytically reacting fluids, such as reforming motor fuel, which comprises a plurality of catalyst chambers, at least four in number, arranged in pairs, the individual members being manifolded with connecting conduits for parallel and series flow, each pair of reactors being interconnected by means of conduits with the other pairs of reactors, whereby reacting fluids may be passed in series through a primary pair of chambers and thence through a secondary pair of chambers, either in series or parallel flow through one or both members of said secondary pair of chambers and so arranged that the flow of reacting fluid may be changed at intervals to pass in series through said secondary pair of chambers and thence in series or parallel to one or both members of the primary pair of chambers. Means are utilized for alternating the flow between the individual chambers in the final pair of chambers so that the reacting fluid may pass from the initial or preceding pair of chambers through one member of the final pair of chambers while a second fluid is passed through the second member of said final pair of chambers, means being provided for alternating the flow between the members of the final pair of reactors whereby the first mentioned reacting fluid is passed through the second mentioned member and the second mentioned fluid is passed through the first mentioned member. Means are utilized for separately withdrawing the fluids from the respective members of the last mentioned pair of chambers. The second mentioned fluid is usually intended for reactivating the catalyst contained in the chamber.

The invention is further understood by reference to the accompanying drawing which is diagrammatic and should not be intended as limiting the invention to the use of the exact apparatus shown. The apparatus indicated is simplified as much as possible, consistent with a clear understanding of the manner in which the operation is conducted.

The two figures are to be taken in conjunction with one another in interpreting the entire process cycle of the invention.

Figure 1:
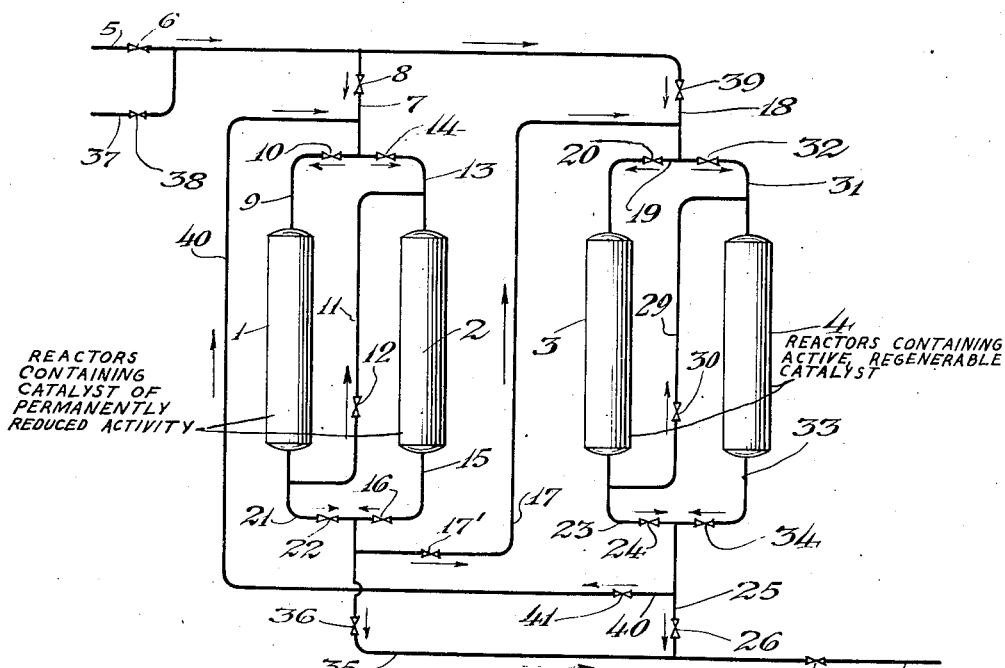
Fig. 1 is an illustration of the arrangement of apparatus for carrying out the conversion portion of the process.

Referring to Fig. 1, the heated hydrocarbons undergoing conversion are introduced through line 5, valve 6, line 7, valve 8, line 9 and valve 10 to reactor 1. The reactor is maintained at the desired conversion temperature and may be of any suitable design for carrying out the particular process in which it is used. The catalyst is maintained in the form of a bed of granular or shaped particles which may be disposed in tubes or reaction chambers or some other suitable type of reactor. The oil passes from the reactor 1 through line 11 and valve 12 to line 13 and thence to reactor 2. Valve 14, contained in line 13, is closed at this time. The reaction products pass from reactor 2 through line 15, valve 16 to line 17, valve 17', line 18, line 19 and valve 20 to reactor 3. During this operation valve 22, contained in line 21 leading from reactor 1, is closed. Reactors 1 and 2 contain catalyst which has been previously used in the process and which has lost a predetermined portion of its catalytic activity. It should be emphasized that this loss in activity is not associated with the loss in activity due to deposition from carbonaceous deposits, but is a loss in catalytic activity over that of the original catalyst which persists after carbonaceous deposits have been removed.

Figure 2:
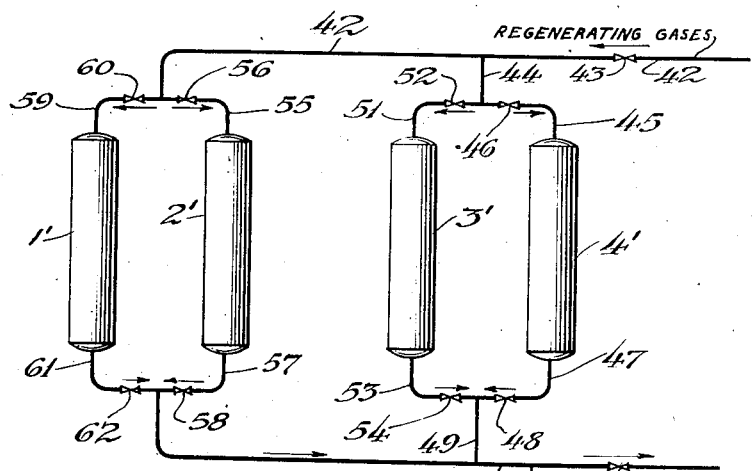
Fig. 2 illustrates the reactivation system as related to the catalytic reactors.

The catalyst contained in reactors 3 and 4 is the most active of any in the series of reactors. This catalyst may be previously unused catalyst which has been placed in the reactors to replace other catalyst which has been substantially spent, or catalyst which has been substantially spent and has been reactivated by some special form of regeneration other than merely burning to remove carbon deposit. In any event the reaction products pass through line 23, valve 24 to line 25, valve 26 and line 27 containing valve 28, and through various heat exchangers, fractionating, condensing, gas recovery, etc., equipment not shown in interests of simplifying the drawing. The desired products of the process are thereby recovered in the conventional manner. During this operation valve 30, contained in line 29, is closed, as is valve 32, contained in line 31 leading to reactor 4 and valve 34, contained in line 33 leading from reactor 4; also valve 36, contained in line 35 leading from the manifolding system of reactors 1 and 2, is closed. During this time the catalyst in reactor 4 is undergoing reactivation by treatment with an oxygen-containing gas primarily to remove carbonaceous deposits from the catalyst. At intervals which may vary according to the conversion process being used, as well as the catalyst, conditions of operation, and other factors influencing the amount of carbon deposition on the catalytic agent, the flow is switched so that catalytic reactor 3 is cut out of the process portion of the cycle and is reactivated while the catalyst in reactor 4 is being used in the process part of the cycle. This is accomplished by opening valves 32 and 34, and closing valves 20 and 24. During this operation valve 30 is closed. The reactivation system for this process is illustrated in Fig. 2 which will be referred to presently.

Hydrogen or a hydrogen-containing gas such as a portion of the gases produced in the process, may be introduced, with or without previous heating, through line 37 and valve 38 joining with the charging stock in line 5.

After operating the process for some time, which is usually judged by some factor directly relating to conversion, such as, for example, yield of the desired product, or, in case of reforming, to a change in antiknock value of the product obtained, the plant is shut down and the catalyst in reactors 1 and 2 is replaced with fresh, or at least more highly active, catalyst. While the plant is shut down to reload towers 1 and 2, towers 3 and 4, or either one of them, may be subjected to additional regeneration. Thereafter the process flow is altered in a manner about to be described so that the less active catalyst contained in reactors 3 and 4 is used in the first of the series, and the more active catalyst which has been placed in reactors 1 and 2 is now used in the final conversion step. This is accomplished by passing the reaction products from line 5 through valve 39 contained in line 18, through line 19, valve 20, line 29, valve 30 to line 31, through reactor 4, thence through line 33 and valve 34 to line 40 and valve 41 joining with line 7. Valves 24, 26 and 32 are closed. The reaction products from line 7 pass through line 9 and valve 10 to reactor 1 and thence through line 21 and valve 22 to line 35 containing valve 36 and thence to line 27 containing valve 28 and to the previously mentioned fractionating, etc., system not shown, whereby the products are recovered.

Valves 12, 14, 16 and 17' are closed and the catalyst in reactor 2 reactivated. At regular intervals reactor 1 is removed from the process portion of the cycle and reactor 2 is substituted therefor, while the catalyst in reactor 1 is undergoing reactivation. This is accomplished by opening valves 14 and 16, and closing valves 10 and 22. During this operation valve 12 is closed. As previously mentioned, this cyclic operation is continued in a regular manner until the activity of the catalyst in reactors 1 and 2 depreciates to an undesirable extent. The plant is shut down and the catalyst in reactors 3 and 4 is replaced with more highly active catalyst and the operation described in the first portion of the cycle is continued. This type of operation is continued at regular intervals in the manner indicated.

It is, of course, within the scope of the invention that a greater number of reactors than are shown should be used. Thus, 6, 8, 10, or even more reactors may be used but in any case, a part of the final group of reactors in the series is used for processing while the remaining part is being reactivated.

As the catalytic activity decreases, the position of the reactors in the process portion of the cycle is shifted so that the incoming charge always contacts the least active catalyst in the first stages and contacts increasingly active catalyst in the succeeding stages until the final stage in which the most active catalyst is obtained. The amount of carbonaceous deposits as previously mentioned is greatest in the final reactors.

The conditions of operation are normally within the range of approximately 350–700° C. at pressures which are substantially atmospheric or slightly superatmospheric, of the order of 300 pounds per square inch or more. It is preferred to maintain a relatively high mass velocity through the catalyst reactors in order to minimize carbon formation and also in order that the major portion of carbon formation occurs in the final reactor. The liquid space velocities, i. e., volume of liquid charged per volume of catalyst per hour, may range from 0.1–20 volumes more or less. When hydrogen is used in the process, the mol ratio of hydrogen to hydrocarbon may vary from approximately 0.5–40, depending upon the charge, operating conditions and the reaction being effected. The mass velocities may vary greatly, but the best results for reforming, for example, are obtained when using approximately 5 mg. or more of charge per sq. cm. of catalyst cross-section per second. The temperatures may be varied somewhat in the various catalytic reactors.

The catalytic agent useful in the process may comprise relatively inert supports having deposited thereon refractory promoting oxides such as those of metals appearing in the left-hand columns of groups IV, V and VI of the periodic table, and particularly those of chromium, molybdenum, tungsten, vanadium, titanium, zirconium and thorium. The relatively inert supports may include alumina, magnesia, zinc oxide, titania, bauxite, silica, firebrick, pumice, various clays, etc. Normally a major portion of the support with a relatively minor portion of one or more of the promoting oxides is used. The catalysts may be further modified by adding relatively minor portions of magnesium or zinc oxide thereto.

Another type of catalyst useful in the process may comprise a major portion of precipitated silica having deposited therewith a refractory oxide of alumina and/or zirconia, and further modified by the addition of an oxide or sulfide of chromium, molybdenum, tungsten, vanadium, titanium or thorium. These catalytic agents are not exactly equivalent and are not necessarily applicable to every process in which the present process may be applied. Moreover the catalysts which may be used in the process should not be construed as limited only to those described. The alumina-chromia or alumina-molybdena type of catalyst is particularly adapted to cyclization reactions and also may be used for dehydrogenation, catalytic cracking, catalytic reforming and dehydrogenation of paraffins to olefins or olefins to diolefins, and the like. The catalyst comprising magnesium oxide containing promoting materials may be used for reforming and dehydrogenation, but are less active for cyclization reactions. The synthetic silica-alumina type of catalyst is more useful for catalytic cracking and reforming than for some other types of reactions. The catalysts are mentioned as illustrative of some which are preferred for the particular reactions described herein but the invention is not limited to those particular materials.

Referring to accompanying Fig. 2, this drawing represents a suitable reactivation system which may be used in connection with the process operation described and illustrated in Fig. 1. The reactors designated 1', 2', 3' and 4' correspond to the reactors 1, 2, 3 and 4 of Fig. 1. As in the previous case, the representation is diagrammatic and intended as illustrative but not as limiting the process unduly. The reactivation system described is intended to be used in conjunction with the process system of Fig. 1. Thus when the first-described operation is being carried out wherein the hydrocabons undergoing conversion are being passed through reactor 1', then through reactor 2', then through reactor 3', and reactor 4' is being regenerated, heated reactivation gases are introduced through line 42, valve 43, line 44, line 45, and valve 46 through reactor 4'. The spent reactivation gases pass through line 47, and valve 48 to line 49, line 50 and valve 51. A portion of these gases may be recycled and the remainder may be discharged to the atmosphere. During this operation valve 52 contained in line 51, and valve 54 contained in line 53 are closed. Valves 56, 58, 60 and 62 contained respectively in lines 55, 57, 59 and 61 are also closed. When the catalyst in reactor 4' is sufficiently reactivated, (that is when the carbon is removed substantially completely) the flow is switched so that reactor 4' is in the process portion of the cycle and reactor 3' is being reactivated. This is done by opening valves 52 and 54 and closing valves 46 and 48. The hydrocarbons are, of course, supplied as previously described in connection with Fig. 1.

When the spent catalyst in reactors 1' and 2' is replaced by more active catalyst, and then the total catalytic activity of the catalyst in reactors 3' and 4' has decreased to the predetermined point, the process flow is changed so that the hydrocarbons pass in series through reactors 3', 4' and 1' while reactor 2' is being reactivated, the valves are in the following positions: valves 46, 48, 52, 54, 60 and 62 are closed and valves 56 and 58 are open. When the reactivation of reactor 2' is complete and the hydrocarbon flow is directed to this reactor, reactor 1' is regenerated by opening valves 60 and 62 and closing valves 56 and 58. Processing and reactivation are conducted in the cyclic manner indicated using time intervals of more or less regular duration.

The composition of the reactivation gases may vary considerably depending on the catalytic agent used. An oxygen-containing gas is used, and while air may be employed in some cases, it is often desirable to dilute air with flue gases or other relatively inert gases in order to cool the reactors by carrying out a portion of the heat evolved during the burning of the carbon and also to prevent an unduly large rise in temperature during this burning operation. Many catalysts are somewhat sensitive to high temperatures and lose their catalytic activity if subjected to temperatures in excess of 1500° F. for long periods of time. The amount of oxygen contained in the reactivation gases usually varies from approximately 1–10%.

We claim as our invention:

1. A process for the conversion of hydrocarbons which comprises introducing the hydrocarbon to a primary set of reaction zones containing catalyst of permanently reduced activity as a result of repeated regeneration and therein subjecting the same to conversion without a substantial formation of carbon withdrawing a stream of resultant conversion products from said primary reaction zones, introducing said stream to a first zone of a secondary set of reaction zones which contain catalyst of greater activity than the catalyst in said primary set of reaction zones, and therein continuing the conversion with a substantial formation of carbon, simultaneously regenerating catalyst in a second zone in said secondary set of reaction zones, and, when the catalyst in said second zone is substantially completely regenerated, diverting the stream of conversion products issuing from said primary set of reaction zones directly to said second zone while continuing the introduction of hydrocarbon to said primary set of reaction zones, and regenerating the catalyst in said first zone.

2. The process of claim 1 further characterized in that the hydrocarbon is passed in series through the primary set of reaction zones.

3. The process of claim 1 further characterized in that the hydrocarbon is passed in parallel through the primary set of reaction zones.

4. The process of claim 1 further characterized in that the primary and secondary sets of reaction zones each comprise two zones.

5. A hydrocarbon reforming process which comprises passing the hydrocarbon through a first reaction zone in contact with a catalyst of permanently reduced activity as a result of repeated regeneration at a mass velocity equal to at least 5 milligrams per square centimeter of catalyst cross section per second and effecting conversion without a substantial formation of carbon, withdrawing a stream of resultant conversion products from said first zone, passing said stream through a second reaction zone containing a catalyst of greater activity than the catalyst in said first zone at a mass velocity equal to at least 5 milligrams per square centimeter of catalyst cross section per second and therein effecting further conversion with a substantial formation of carbon, simultaneously regenerating in a third reaction zone catalyst of an activity at least equal to that in said second zone, and, when the catalyst in said third zone is substantially completely regenerated, diverting the stream of conversion products issuing from said first zone directly to said third zone while continuing the introduction of hydrocarbon to said first zone, and regenerating the catalyst in said second zone.

WILLIAM J. MATTOX.
WAYNE L. BENEDICT.